United States Patent Office 3,646,013
Patented Feb. 29, 1972

3,646,013
PROCESS FOR THE PREPARATION OF ALDOSTERONE 21-ESTERS
Alberto Ercoli, Milan, Rinaldo Gardi, Carate Brianza, and Romano Vitali, Casatenovo, Italy, assignors to Warner-Lambert Pharmaceutical Company, Morris Plains, N.J.
No Drawing. Filed Feb. 16, 1970, Ser. No. 11,909
Int. Cl. C07c *173/00*
U.S. Cl. 260—239.55       5 Claims

ABSTRACT OF THE DISCLOSURE

A process for the preparation of aldosterone 21-esters in which a corresponding 18-ester -21-acetate of aldosterone is subjected to basic solvolysis: by detachment of the 21-acetate ester and following migration of the esters in 18-position towards 21-position the final aldosterone 21-esters are obtained.

---

The present invention relates to a process for the preparation of certain 21-esters of aldosterone.

It is known that aldosterone consists of three tautomeric forms in equilibrium

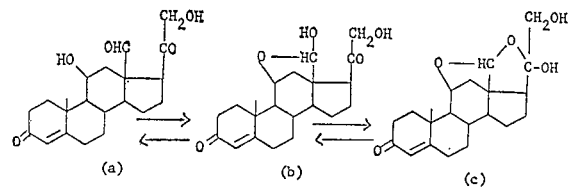

the semi-acetal form (b) reacting in most of the chemical reactions.

According to usual methods aldosterone 21-monoesters cannot be obtained in good yields because the semi-acetal form of aldosterone shows two hydroxy groups, i.e. the primary hydroxyl in 21-position and the acetal-type hydroxyl in 18-position, which have more or less the same reactivity and therefore do not allow any selective reaction. In fact, a direct esterification of free aldosterone can give the corresponding 18,21-diester as a by-product, while a partial hydrolysis of an 18,21-diester can lead to a certain amount of free aldosterone, with consequent decrease in yield of 21-monoester.

It has now been found that certain aldosterone 21-esters can be obtained selectively in very good yields by solvolysis of corresponding 18-esters, 21-acetates.

In particular it has been found that basic solvolysis of certain 18-esters of aldosterone 21-acetate gives rise to detachment of the 21-acetate ester and migration of the ester in 18-position towards 21-position according to the following equation:

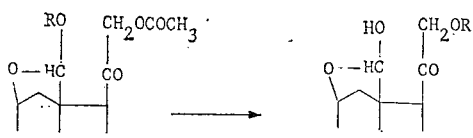

whereby the corresponding 21-monoester of aldosterone is obtained.

The finding is of great importance since aldosterone 21-acetate is easily available as the final product of the aldosterone synthesis according to D. H. R. Barton and J. M. Beaton (J. Am. Chem. Soc. 82, 2641; 1960) and can be easily converted into its 18-esters by esterification with the chloride or the anhydride of the desired acid. So, according to the process of the present invention it is possible to prepare higher 21-esters of aldosterone starting from aldosterone 21-acetate direct.

The compounds obtainable according to the process of the present invention are characterized by the following general formula:

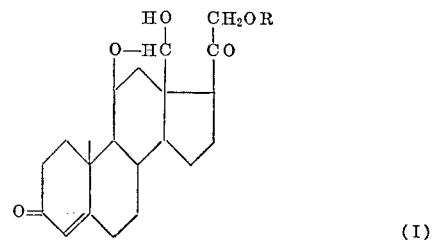

wherein R is selected from the group consisting of the groups

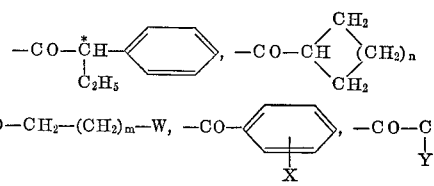

in which $n$ is an integer of from 1 to 9 inclusive, $m$ is selected from 0 and 1, W is selected from the group consisting of cyclopentyl, cyclohexyl and phenyl, X is selected from the group consisting of hydrogen, methyl, methoxy and halogen, Y is selected from the group consisting of hydrogen and methyl and Z is an aliphatic hydrocarbon radical containing from 1 to 9 carbon atoms.

The term "aliphatic hydrocarbon radical containing from 1 to 9 carbon atoms" includes saturated or unsaturated, straight or branched chain aliphatic hydrocarbon residues such as methyl, ethyl, propyl, isopropyl, n-butyl, iso-butyl, n-amyl, iso-amyl, n-hexyl, n-heptyl, vinyl, allyl, crotyl, 8-nonenyl, ethynyl, propargyl and the like. The term halogen indicates fluorine, chlorine and bromine.

The 21-monoesters obtainable according to the process of the present invention have been shown, by Formula I in their semi-acetal form, but it is understood that they also include the tautomeric forms deriving from the forms (a) and (c) of aldosterone.

According to the present invention the solvolysis is carried out by treating the corresponding 18 esters of aldosterone 21-acetate of formula:

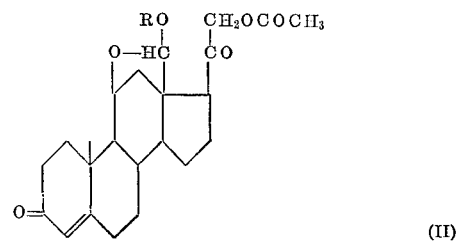

wherein R has the above stated meaning, with a lower alkanol in the presence of a basic catalyst.

As a catalyst there is utilized an organic or inorganic base having a $pK_b$ lower than 8. Exemplary of suitable catalysts are the alkali metal hydroxides, alkoxides, carbonates, bicarbonates, hydrogen phosphates and phosphates, the alkaline eath metal hydroxides and alkoxides, the quaternary ammonium bases, the strong or middling strong organic bases such as pyrrolidine, piperidine, cyclohexylamine, triethylamine, piperazine, ethanolamine and morpholine.

The terms "alkali metal" and "alkaline earth metal" include the metals falling respectively within Groups I*a* and II*a* of the Periodic Chart of the Elements such as, for example, lithium, sodium, potassium, rubidium, cesium, beryllium, magnesium, calcium, strontium, and barium.

Sodium and potassium hydroxides, sodium and potassium methoxides, sodium and potassium carbonates and bicarbonates, tetramethyl-, tetraethyl-, and benzyltrimethylammonium hydroxydes are preferred catalysts.

As pointed out above, the solvolysis according to the present invention is carried out in a lower alkanol solution. The term "lower alkanol" includes straight and branched chain alcohols containing from 1 to 4 carbon atoms such as, for example, methanol, ethanol, propanol, iso-propanol and butanols. Among these lower alkanols methanol and ethanol are particularly suitable.

Sometimes, but not necessarily, other solvents, for example dioxane or tetrahydrofurane, can be used in admixture with the lower alkanol.

The reaction time of the solvolysis depends on both the starting material and the catalyst employed and generally is comprised between about 10 minutes and about 80 hours. Upon completion of the reaction the product is isolated according to the usual methods, for example by simple filtration or by evaporation of the solvent and crystallization of the residue.

According to a preferred embodiment of the present process, the 18-ester of aldosterone 21-acetate is dissolved in about 50 volumes (for example, 50 cc. of solvent per g. of starting material) of the selected lower alkanol (for example, methanol). To this solution there are added approximately 20–25 volumes of a 0.1–20% aqueous solution of the basic catalyst (for example, a 3% aqueous solution of potassium bicarbonate or a 2% aqueous solution of tetraethylammonium hydroxide). Under these conditions the end product precipitates and, upon completion of the solvolysis, can be separated by filtration.

Alternatively, in particular when the catalyst cannot be used in aqueous solution, the 18-ester of the aldosterone 21-acetate is dissolved in about 150 volumes of the selected lower alkanol which may contain about 10% of another solvent (for example, 150 cc. of a 10:1 methanol-tetrahydrofurane mixture per g. of starting material. To this solution there are added 6 volumes approximately of from about 0.01 to about 0.1 molar solution of the selected basic catalyst (for example 6 cc. of a 0.05 molar solution of sodium methoxide in methanol per g. of starting material) and the resulting mixture is maintained 2–4 hours at room temperature, preferably under inert atmosphere. Finally, the solution is neutralized, for example by treatment with potassium dihydrogen phosphate, ammonium chloride or acetic acid and the end product is isolated according to normal procedures.

The 18-esters of aldosterone 21-acetate employed as starting materials can be prepared according to well known methods by treating aldosterone 21-acetate with an esterifying agent derived from an acid of formula R—OH, where R has the above stated meaning.

The aldosterone 21-esters which can be prepared according to the process of the present invention are useful for their interesting biological properties, for example for their enhanced adrenocortical activity, and can be included in pharmaceutical compositions in association with a suitable pharmaceutical carrier.

Of the following examples, Example 1 illustrates the preparation of starting materials and Examples 2 to 17 illustrate the process of the present invention.

This process may be also successfully carried out for the preparation of 21-esters of 1-dehydroaldosterone and this should be considered a further scope of the invention. Although the starting compounds of Formula II employed in the process of the instant invention have been described above as having the only acetic ester at position 21, other easily saponifiable 21-esters such as the formiate, the propionate, the butyrate and their derivatives of substitution, or substituted acetates, in particular the haloacetates, for example the chloroacetate, the dichloroacetate or the trifluoroacetate can be similarly utilized for the solvolysis. The solvolysis of these compounds, too, is included within the scope of the present invention.

EXAMPLE 1

A mixture of 5 g. of aldosterone 21-acetate, 5 cc. of benzoyl chloride and 35 cc. of pyridine in 150 cc. of chloroform is maintained at −20° C. for one hour, then overnight at 0–5° C. and finally is poured into ice-water. The resulting mixture is extracted with methylene chloride and the extract, washed with dilute hydrochloric acid, with a solution of sodium bicarbonate, and then with water, is dried over anhydrous sodium sulfate and evaporated under reduced pressure to dryness. The residue, recrystallized from a methylene chloride-methanol mixture, gives 4.5 g. of aldosterone 18-benzoate, 21-acetate, 190–192° C.

Operating as described above the following 18-esters of aldosterone 21-acetate are obtained:

aldosterone 18-(d)-α-phenylbutyrate,21-acetate;
  M.P. 201–203° C.,
aldosterone 18-hexahydrobenzoate,21-acetate;
  M.P.112–117° C.,
aldosterone 18-o-toluate,21-acetate; M.P. 172–174° C.,
aldosterone 18-m-toluate,21-acetate; M.P. 175–177° C.,
aldosterone 18-p-toluate,21-acetate; M.P. 189–192° C.,
aldosterone 18-p-fluorobenzoate,21-acetate;
  M.P. 135–138° C.,
aldosterone 18-o-chlorobenzoate,21-acetate;
  M.P. 203–205° C.,
aldosterone 18-m-chlorobenzoate,21-acetate;
  M.P. 127–130° C.,
aldosterone 18-p-chlorobenzoate,21-acetate;
  M.P. 160–164° C.,
aldosterone 18-anisate,21-acetate; M.P. 182–184° C.,
aldosterone 18-oenanthate,21-acetate; M.P. 180–
  182° C., and
aldosterone 18-isobutyrate,21-acetate; M.P. 213–216° C.

EXAMPLE 2

A solution of 1 g. of aldosterone 18-o-toluate, 21-acetate in 150 cc. of methanol is treated with 6 cc. of a 0.05 M solution of sodium methoxide in methanol and maintained under nitrogen for 3 hours. Then 6 cc. of a 1% potassium dihydrogen phosphate solution is added and the mixture is concentrated under reduced pressure. The residue is extracted with methylene chloride, then the solvent is evaporated to dryness and the residue is taken up with ether. By filtration, aldosterone 21-o-toluate is obtained which, after recrystallization from a methylene chloride-methanol mixture, weighs 575 mg.; M.P. 160–162° C., $[\alpha]_D^{24} = +96°$ (dioxane, c.=0.5%).

By operating in an analogous manner, aldosterone 21-p-toluate is obtained; M.P. 233–235° C., $[\alpha]_D^{24} = +93°$ (dioxane, c.=0.5%).

EXAMPLE 3

To a solution of 3 g. of aldosterone 18-(d)-α-phenylbutyrate,21-acetate in 450 cc. of methanol and 45 cc. of anhydrous tetrahydrofurane there is added 18 cc. of a 0.05 M solution of sodium methoxide in methanol. The mixture obtained is maintained for 140 minutes under nitrogen and then treated with 24 cc. of a 1% sodium dihydrogen phosphate solution. The solvent is eliminated under reduced pressure and the residue is extracted with methylene chloride. By evaporation of the solvent and crystallization of the residue from methanol there is obtained 1.235 g. of aldosterone 21-(d)-α-phenylbutyrate; M.P. 166–171° C., $[\alpha]_D^{24} = +118°$ (dioxane, c.=0.5%).

EXAMPLE 4

To a solution of 4 g. of aldosterone 18-benzoate, 21-acetate in 200 c. of methanol there is added, under stirring and at room temperature, 80 cc. of a 3% potassium bicarbonate solution. After about 10 minutes a crystalline product begins to separate which after 60 minutes is filtered and washed with water. By crystallization from a methylene chloride-methanol mixture, 3 g. of pure aldosterone 21-benzoate is obtained; M.P. 223–225° C., $[\alpha]_D^{24} = +96°$ (dioxane, c.=0.5%).

EXAMPLE 5

To a solution of 1 g. of aldosterone 18 - p - fluorobenzoate, 21-acetate in 50 cc. of methanol there is added, under stirring and at room temperature 20 cc. of an aqueous potassium bicarbonate solution. After about 2 minutes a crystalline precipitate begins to separate which after 30 minutes is filtered. By crystallization from a methylene chloride-acetone mixture there is obtained 715 mg. of pure aldosterone 21-p-fluorobenzoate; M.P. 231–232° C., $[\alpha]_D^{24} = +102.5°$ (dioxane, c.=0.5%).

EXAMPLES 6–16

50 mg. of aldosterone 18-p-toluate, 21-acetate are dissolved in 2 cc. of the selected lower alkanol and the solution obtained is treated with an aqueous solution of the basic catalyst according to the procedure described in Examples 4 and 5. Upon completion of the precipitation, chromatographically pure aldosterone 21-p-toluate is obtained, identical to the product described in Example 2.

In Table I there are reported, for each example, the basic catalyst and the lower alkanol employed as well as the yield of aldosterone 21-p-toluate.

TABLE I

| Example | Catalyst Base | Conc., percent | lower alkanol | Final yield, mg. |
|---|---|---|---|---|
| 6 | Potassium carbonate | 1 | Methanol | 36 |
| 7 | do | 1 | Ethanol | 37 |
| 8 | do | 1 | n-Propanol | 36 |
| 9 | Sodium hydroxide | 0.5 | Ethanol | 41 |
| 10 | do | 0.5 | t-Butanol | 26 |
| 11 | Barium hydroxide octahydrate | 1 | Ethanol | 28 |
| 12 | Tetraethylammonium hydroxide | 2 | do | 46 |
| 13 | Triethylamine | 10 | do | 36 |
| 14 | Ethanolamine | 10 | Methanol | 30 |
| 15 | Piperazine hexahydrate | 20 | do | 38 |
| 16 | Morpholine | 10 | do | 31 |

EXAMPLE 17

By operating according to one of the Examples 2 to 16 the following aldosterone 21-monoesters are obtained:

aldosterone 21-hexahydrobenzoate; M.P. 193–195° C., $[\alpha]_D^{24} = +105.5°$ (dioxane, c.=0.5%);
aldosterone 21-m-toluate; M.P. 179–183° C., $[\alpha]_D^{24} = +97°$ (dioxane, c.=0.5%);
aldosterone 21-o-chlorobenzoate, M.P. 185–187° C., $[\alpha]_D^{24} = +93°$ (dioxane, c.=0.5%);
aldosterone 21-m-chlorobenzoate, M.P. 171–174° C., $[\alpha]_D^{24} = +93.5°$ (dioxane, c.=0.5%);
aldosterone 21-p-chlorobenzoate; M.P. 231–234° C., $[\alpha]_D^{24} = +90.5°$ (dioxane, c.=0.5%);
aldosterone 21-anisate; M.P. 223–224° C.; $[\alpha]_D^{24} = +82°$ (dioxane, c.=0.5%);
aldosterone 21-o-enanthate; M.P. 142–144° C., $[\alpha]_D^{24} = +115°$ (dioxane, c.=0.5%); and
aldosterone 21-isobutyrate; M.P. 142–144° C., $[\alpha]_D^{24} = +122°$ (dioxane, c.=0.5%).

We claim:
1. A process for the preparation of 21-monoesters of aldosterone of formula

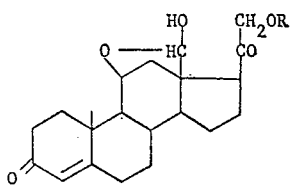

wherein R is selected from the group consisting of

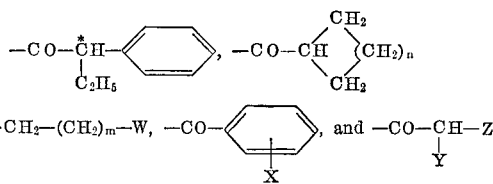

in which $n$ is an integer of from 1 to 9 inclusive, $m$ is selected from 0 to 1, W is selected from the group consisting of cyclopentyl, cyclohexyl, and phenyl, X is selected from the group consisting of hydrogen, methyl, methoxy and halogen, Y is selected from the group consisting of hydrogen and methyl and Z is an aliphatic hydrocarbon radical containing from 1 to 9 carbon atoms, wherein the corresponding aldosterone-18,21-diesters of the formula:

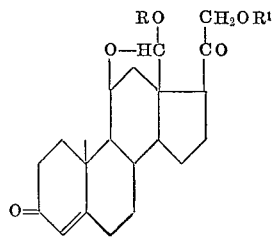

wherein R has the above stated meaning and $R^1$ is selected from the group consisting of formyl, acetyl, propionyl, butyryl and halo-substituted acetyl, are treated with a lower alkanol in the presence of an organic or inorganic basic catalyst having a $pK_b$ lower than 8.

2. A process according to claim 1 in which the base is selected from the group consisting of sodium hydroxide, potassium hydroxide, sodium carbonate, potassium carbonate, sodium bicarbonate, potassium bicarbonate, tetramethylammonium hydroxide, tetraethyl-ammonium hydroxide and benzyltrimethylammonium hydroxide.

3. A process according to claim 1 in which the lower alkanol is selected from the group consisting of methanol and ethanol.

4. A process according to claim 1 wherein the aldosterone-18,21-diester starting materials have the formula:

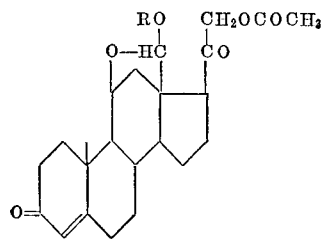

wherein R is selected from the group consisting of

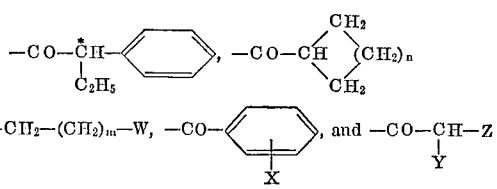

in which $n$ is an integer of from 1 to 9 inclusive, $m$ is selected from 0 and 1, W is selected from the group consisting of cyclopentyl, cyclohexyl, and phenyl, X is selected from the group consisting of hydrogen, methyl, methoxy and halogen, Y is selected from the group consisting of hydrogen and methyl and Z is an aliphatic hydrocarbon radical containing from 1 to 9 carbon atoms.

5. A process for the preparation of aldosterone 21-(d)-α-phenyl-butyrate which comprises treating the corresponding aldosterone 18-(d)-α-phenylbutyrate 21-acetate with a lower alkanoli in the presence of an organic or inorganic base having a $pH_b$ lower than 8.

No references cited.

HENRY A. FRENCH, Primary Examiner

U.S. Cl. X.R.

260—999

UNITED STATES PATENT OFFICE
CERTIFICATE OF CORRECTION

Patent No. 3,646,013          Dated Feb. 29, 1972

Inventor(s) Alberto Ercoli et al.

It is certified that error appears in the above-identified patent and that said Letters Patent are hereby corrected as shown below:

In the title portion, "Warner-Lambert Pharmaceutical Company" should read --- Warner-Lambert Company ---

In the title portion, after Serial No. 11,909, insert --- Claims priority, application Italy, February 19, 1969, 13,035 A/69 --.

Column 2, line 62, the word "eath" should read ---earth---

Column 5, line 61, the term "21-o-enanthate" should read ---21-oenanthate---

Column 8, line 2, the term "$pH_b$" should read ---$pK_b$---

Signed and sealed this 17th day of October 1972.

(SEAL)
Attest:

EDWARD M. FLETCHER, JR.
Attesting Officer

ROBERT GOTTSCHALK
Commissioner of Patents